US008933676B2

(12) United States Patent
Schwartz

(10) Patent No.: US 8,933,676 B2
(45) Date of Patent: Jan. 13, 2015

(54) OUTPUT POWER CONTROL CIRCUIT FOR A THERMOELECTRIC GENERATOR

(75) Inventor: David E. Schwartz, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 386 days.

(21) Appl. No.: 13/443,835

(22) Filed: Apr. 10, 2012

(65) Prior Publication Data

US 2013/0265023 A1  Oct. 10, 2013

(51) Int. Cl.
*G05F 1/00* (2006.01)

(52) U.S. Cl.
USPC ........................................................ 323/271

(58) Field of Classification Search
CPC ............................ H02M 3/33515; G05F 1/462
USPC ............ 323/268, 271, 282, 283, 285; 363/16, 363/20, 21.01, 21.04, 21.05, 21.1, 21.11
See application file for complete search history.

(56) References Cited

U.S. PATENT DOCUMENTS 6,886,754 B2 * 5/2005 Smith et al. ..................... 236/10
7,528,502 B2 * 5/2009 Maeda ............................ 307/46

FOREIGN PATENT DOCUMENTS

JP          2008022688 A       1/2008

OTHER PUBLICATIONS

Chen et al., "Modeling and Power Conditioning for Thermoelectric Generation", IEEE, 2008, pp. 1098-1103.
Schoeman et al., "A Simplified Maximal Power Controller for Terrestrial Photovoltaic Panel Arrays", IEEE, 1982, pp. 361-367.
Mar. 9, 2011, Kim et al., "A Digital Coreless Maximum Power Point Tracking Circuit for Thermoelectric Generators", Journal of Electronic Materials, vol. 40, No. 5, 2011, pp. 867-872.
Cho et al., "A Coreless Maximum Power Point Tracking Circuit of Thermoelectric Generators for Battery Charging Systems", IEEE, 2010, 4 pages.
Oct. 25, 2010, Kim et al., "A Maximum Power Point Tracking Circuit of Thermoelectric Generators Without Digital Controllers", IEICE Electronics Express, vol. 7, No. 20, 2010, pp. 1539-1545.

* cited by examiner

*Primary Examiner* — Matthew Nguyen
(74) *Attorney, Agent, or Firm* — Hollingsworth Davis, LLC

(57) ABSTRACT

An output power tracking control system for a thermoelectric generator (TEG) is described. The output terminal of the TEG is coupled to the input terminal of the switching voltage converter. The system also includes control circuitry including a pulse width modulator (PWM) having at least one PWM output terminal coupled to the switching control terminal of the switching voltage converter. The PWM generates pulses at the PWM output terminal having a duty cycle that varies based on a difference between a loaded output voltage of the TEG and a predetermined fraction of an unloaded open circuit voltage of the TEG, $V_{oc}$. The duty cycle of the pulses is configured to maintain the loaded voltage at the output terminal of the TEG to within a tolerance range of the fraction of $V_{oc}$.

21 Claims, 10 Drawing Sheets

OUTPUT POWER CONTROL CIRCUIT FOR A THERMOELECTRIC GENERATOR

SUMMARY

Embodiments discussed in this disclosure involve output power tracking control for a thermoelectric generator. A thermoelectric generator (TEG) is configured to develop a voltage between an output terminal and a common terminal based on a temperature difference between hot and cold portions of the TEG. An output power tracking control system for the TEG includes a switching voltage converter having an input terminal, a common terminal, and a switching control terminal. The output terminal of the TEG is coupled to the input terminal of the switching voltage converter. The system also includes control circuitry including a pulse width modulator (PWM) having at least one PWM output terminal coupled to the switching control terminal of the switching voltage converter. The PWM is configured to generate pulses at the PWM output terminal which have a duty cycle that is variable based on a difference between a loaded output voltage of the TEG and a predetermined fraction of an unloaded open circuit voltage of the TEG, Voc. The duty cycle of the pulses is configured to maintain the loaded voltage at the output terminal of the TEG to within a tolerance range of the fraction of Voc. In some cases, the output power tracking control system is operated to track the maximum output power which occurs when the fraction Voc is Voc/2.

According to some aspects, the control circuitry includes sample and hold circuitry, voltage divider circuitry, and sampling circuitry. The sampling circuitry is configured to periodically electrically decouple the output terminal of the TEG from the switching voltage converter so that Voc is present at the output of the TEG. In some cases, the voltage divider is located at the input of the sample and hold and provides the fraction of Voc at the sample and hold input. In other cases, the sample and hold circuitry is configured to sample Voc and the output of the sample and hold is voltage divided. The sampling circuitry provides a control input to the sample and hold which causes the sample to be taken during the sampling period during which Voc is present at the output of the TEG.

According to some aspects, the control circuitry uses temperature sensing to develop the control signal that corresponds to the fraction of Voc. For example, the control circuitry may include temperature sensors that measure the hot and cold portions of the TEG and develop the signal that corresponds to the fraction of Voc based on the temperature differential between the hot and cold portions. The temperature sensors can be substantially linear with temperature over the operating range of the TEG, or may be non-linear. Calibration and/or linearization of the temperature sensor outputs can be accomplished using analog or digital signal processing. If digital signal processing is used, the temperature circuitry may include an analog to digital converter configured to convert the temperature signal from an analog temperature signal to a digital temperature signal. Digital processing circuitry can provide linearization and/or calibration of the digital signal. The linearized and/or calibrated digital signal can be converted back to an analog signal using a digital to analog converter. The analog output signal corresponds to the fraction of Voc. For example, in some implementations, the digital processing circuitry includes a processor which is configured to implement program instructions to process the digital signals. In some approaches, the calibration and/or linearization coefficients may be stored in a lookup table that is accessible by the processor.

According to various implementations, the switching voltage converter may be one or more of a buck converter, a boost converter, a single-ended primary inductor converter (SEPIC), a buck-boost converter, a Ćuk converter, a zeta converter, and other non-isolated switching converters; a forward converter, a flyback converter, and other isolated switching converters; and derivatives thereof, including those using resonant or quasi-resonant switches. The switching voltage converter may or may not be a synchronous voltage converter.

The TEG can be a single discrete TEG unit or may comprise multiple discrete TEG units connected in one or both of parallel and series.

In some cases, the loaded output voltage of the TEG tracks the predetermined output power, e.g., maximum output power, within a tolerance range of about +/−5%, less than +/−5%, or even about +/—1%.

In some embodiments a TEG system that includes output power tracking comprises a thermoelectric generator (TEG) having an output terminal, a switching voltage converter having an input terminal and a switching control terminal, where the output terminal of the TEG is coupled to the input terminal of the switching voltage converter. The TEG system further includes sample and hold circuitry and sampling circuitry. The sampling circuitry is configured to periodically electrically decouple the output terminal of the TEG from the switching voltage converter so that an unloaded open circuit voltage, Voc, of the TEG is present at the output of the TEG. The sampling circuitry is further configured to cause a sample of Voc, or a fraction of Voc, be taken by the sample and hold circuitry. The TEG system also includes a pulse width modulator (PWM) having at least one PWM output terminal coupled to the switching control terminal of the switching voltage converter. The PWM is configured to generate pulses at the PWM output terminal, the pulses having a duty cycle based on a difference between a loaded voltage of the TEG and the fraction of Voc. The duty cycle of the pulses is configured to maintain the loaded voltage at the output of the TEG to within a tolerance range of the fraction of Voc. The fraction of Voc is Voc/2 if the maximum output power is tracked.

Some embodiments are directed to a method that involves generating electrical energy based on a temperature difference using a thermoelectric generator (TEG). A first voltage present at an output terminal of the TEG is converted to a second voltage using a switching voltage converter. The switching voltage converter is controlled by pulses having a duty cycle that can vary based on a difference between a loaded output voltage at the output of the TEG and a fraction of the unloaded, open circuit voltage, Voc, of the TEG. The loaded voltage at the output terminal of the TEG is maintained to within a tolerance range of the fraction of Voc. For example, the tolerance range may be about +/−5% or about +/1%. The fraction of the Voc may be Voc/2.

Some implementations involve taking a sample of Voc or a sample of some fraction of Voc. These implementations may include periodically electrically decoupling the output terminal of the TEG from the switching voltage converter so that Voc is present at the output of the TEGs. Voc or the fraction of Voc is present at the output terminal of the TEG during the time that the output terminal of the TEG is electrically decoupled from the switching voltage converter.

Some implementations involve determining Voc by measuring the temperatures of the hot and cold portions of the device. In these implementations the fraction of Voc can be determined based on the sensed temperatures.

The above summary is not intended to describe each embodiment or every implementation. A more complete understanding will become apparent and appreciated by referring to the following detailed description and claims in conjunction with the accompanying drawings.

DESCRIPTION OF VARIOUS EMBODIMENTS

Figure 1:
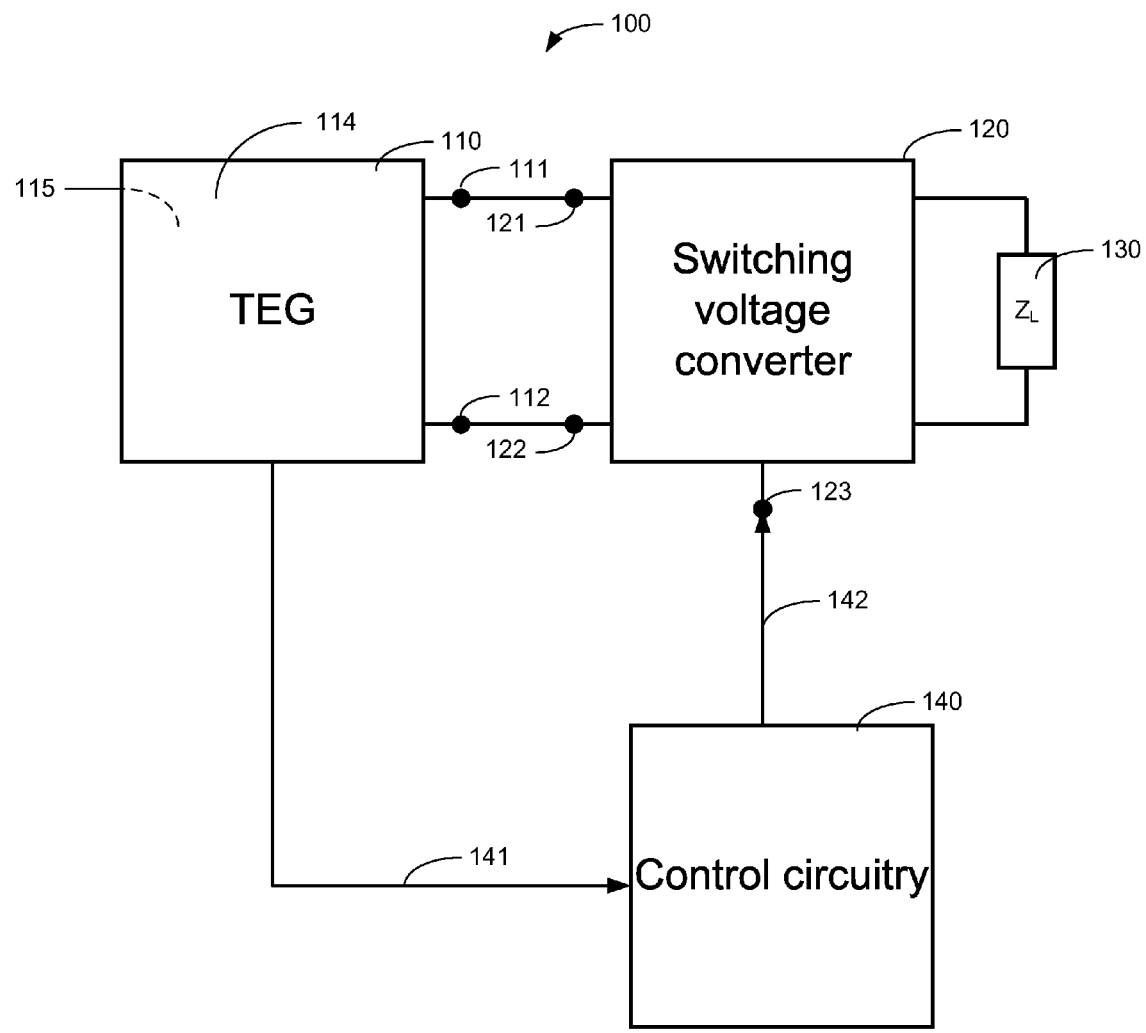
FIG. 1 is a block diagram of a TEG output power tracking control system in accordance with some embodiments.

Thermoelectric generators (TEGs) are devices that convert a temperature difference between the hot and cold portions of the TEG into electrical energy, based on the Seebeck effect. As a compact, solid-state device that converts heat to electricity, the thermoelectric generator (TEG) fills a niche in the renewable energy landscape, particularly for waste heat harvesting. While large-scale, high or medium temperature waste heat harvesting, such as for industrial applications, can be served by turbines or organic Rankine or Stirling engines, these technologies are less suitable for use at lower temperature differentials and/or lower power levels. Other compact heat engines, including magnetic and pyroelectric generators, are relatively immature and can involve temperature cycling, with mechanical motion or fluid pumping. In contrast, TEGs, have no moving parts and have dedicated isothermal surfaces. TEGs are particularly attractive for waste heat harvesting from vehicle exhaust and from solar energy, among other applications.

As with any power source, appropriate electronics are needed to interface between a TEG and its load such that a desired or optimal power output is achieved. In many applications, it is desirable to maximize the power delivered to the load for a given input temperature differential. As the temperatures and load can vary over time, a dynamic method is needed to maintain optimal power extraction. In some cases, it is desirable to provide for TEG power conditioning using analog or discrete component systems that do not require more complex analog-to-digital converters (ADCs) and/or microcontrollers to provide optimal current or power.

A TEG can be modeled as a voltage source with a series output resistor. The open circuit voltage is given by $Voc=\alpha\Delta T$, where $\alpha$ is the Seebeck coefficient and $\Delta T$ is the temperature differential between the hot and cold portions the device. The source output resistance Rs varies with temperature, but not with the load, so maximum power is achieved when the load resistance seen by the TEG is equal to Rs.

Embodiments discussed below involve approaches for controlling the loaded output voltage of the TEG so that the TEG is operated at a predetermined output power, e.g., at or close to the maximum. Various control approaches discussed below involve determining the TEG's open circuit output voltage, Voc, (or some fraction of Voc) and controlling the loaded output voltage of the TEG to correspond to the predetermined output power. Voc or the fraction of Voc can be directly measured, or Voc of the TEG can be determined by measuring one or more parameters of the TEG which are related to Voc, such as the temperatures of the hot and cold portions of the TEG. In some cases, the control system approaches discussed below do not involve digital processing circuitry, e.g., a microcontroller and analog-to-digital converter. The TEG systems described below are agnostic to the type of load as long as the load has a positive resistance characteristic, and are compatible with synchronous converter architectures. The TEG control systems can be built with available discrete components, or the components can be integrated into one or more integrated circuits. Measurement results of a demonstration TEG system using a single-ended primary inductor converter (SEPIC) are presented.

Output power tracking for a TEG involves maintaining the loaded TEG output voltage at a predetermined fraction of Voc. For example, at maximum power, the TEG voltage is half of Voc. Therefore, the maximum output power can be obtained by maintaining the output voltage of the TEG at Voc/2. Maintaining the output voltage of the TEG can be achieved by varying the duty cycle of a switching voltage converter.

The output power tracking systems described herein are based on the recognition that the maximum power and load determine the output voltage, thus additional regulated stages in that output power tracking system can in some cases be eliminated. The single-stage converter embodiments presented here provide enhancements in manufacturability over previous designs. The TEG control system can be made using off-the-shelf parts and employing pulse-width modulation, which can allow higher efficiency with synchronous rectification.

FIG. 1 is a block diagram of a TEG output power tracking control system 100. The system includes a TEG 110 having an output terminal 111 and a common terminal 112. When the TEG is not driving a load, a temperature differential $\Delta T$ between the hot and cold sides 114, 115 of the TEG causes an open circuit voltage, Voc, to be generated between the output terminal 111 and the common terminal 112 of the TEG 110 according to the relationship $Voc=\alpha\Delta T$.

In the output power tracking system 100 of FIG. 1, the output terminal 111 of the TEG 110 is coupled to the input terminal 121 of switching converter 120 and the common terminals 112, 122 of the TEG 110 and the switching voltage converter 120 are connected. The switching converter 120 is coupled to the load, $Z_L$ 130. The TEG output power tracking system 100 includes a control system 140 having a feedback input 141 that is derived from the TEG 110 and is related to the Voc of the TEG 110. For example, the feedback input signal 141 may correspond to Voc or a parameter related to Voc, such as sensed temperatures of the hot and cold portions 114, 115 of the TEG 110, and/or the temperature difference between the hot and cold portions 114, 115 of the TEG 110. The control system 140 generates an output signal 142 comprising a pulse train having a duty cycle that is variable as a function of the input 141 to the control system 140. The control signal 142 is applied to the switching control input 123 of the voltage converter 120. When the duty cycle of the control signal 142 corresponds to the predetermined output power of the TEG system 100, the control pulses drive the voltage converter to the predetermined output power. For maximum power transfer from the TEG 110, the duty cycle of the control signal 142 drives the voltage converter to maintain an output voltage of the TEG 110 of Voc/2.

Figure 2:
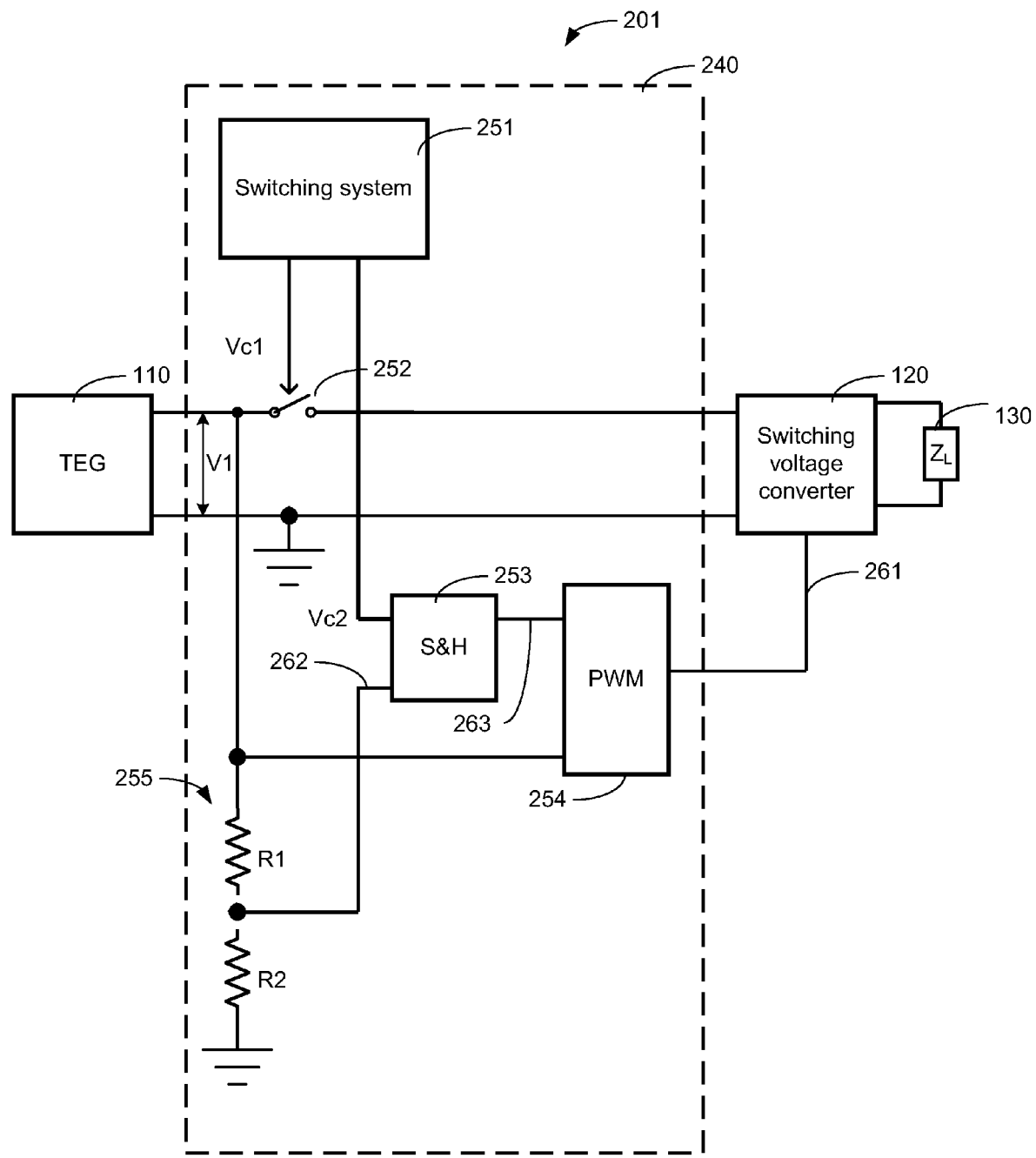
FIG. 2 is a block diagram showing the control system portion of a TEG system in more detail according to some embodiments.

FIG. 2 shows a more detailed version of the control portion of a TEG output power tracking system 200 according to some implementations. As in FIG. 1, the system of FIG. 2 includes a TEG 110, a switching voltage converter 120, and a load 130. The switching voltage converter 120 may be one or more of a buck converter, a boost converter, a single-ended primary inductor converter (SEPIC), a buck-boost converter, a Ćuk converter, a zeta converter, and other non-isolated switching converters; a forward converter, a flyback converter, and other isolated switching converters; and derivatives thereof, including those using resonant or quasi-resonant switches. The control system 240 includes components 251-255 which are used to produce a switching control signal 261 used to control the output of the switching voltage converter 120. The switching control signal 261 has a duty cycle that is related to the Voc of the TEG and drives the switching voltage converter to maintain the output of the TEG, V1, at the voltage that provides the predetermined output power, e.g., maximum power. In the implementation shown in FIG. 2, the output of the TEG, V1, is connected through a switch 252 capable of effectively disconnecting the TEG output from the converter input. The switch can be any kind of transistor, such as a field effect transistor (FET), a relay, reed switch, optoisolator or any other type of switch. The output of the converter 120 is connected to the load, $Z_L$ 130, which can be a constant resistance, constant voltage (e.g. for battery charging), constant current, or any other type of load.

The output of the TEG 110, V1, is also connected through a resistive divider 255 to the input 262 of a sample and hold (S&H) circuit 253, such that the S&H input 262 is half of V1. The resistors R1 and R2 should be large so they don't load the TEG 210. In some cases, the predetermined output power for operation of the TEG system 200 is the maximum output power. For operation at the maximum output power, R1 and R2 are equal. In one implementation, the S&H 253 is a capacitor with a sampling switch, though a circuit with an output buffer may alternatively be used. Sample and hold integrated circuits (ICs), such as the LF398 from National Semiconductor, are commercially available.

In operation, the switch 252 connecting the TEG 110 to the converter 120 should be closed except during periodic sampling which is controlled by switching circuitry 251. When the switch 252 is open, the TEG 110 is electrically decoupled from the switching converter 120 and the output of the TEG 110 is Voc, which is the feedback input signal. During the time that the switch 252 is open, the unloaded output voltage of the TEG 110 (Voc) is voltage divided by divider 255 so that the output of the S&H 253 is Voc/2 (assuming R1 and R2 are equal). In general, voltage divider 255 may provide any fraction of Voc depending on the values of R1 and R2. In some implementations, the switching circuitry 251 maintains the switch 252 in the off (open) condition for a window that extends slightly beyond the sampling time of the S&H 253, so that the output voltage of the TEG, V1 remains at Voc until the sampling is complete.

Sample signals Vc1 and Vc2 are provided by the sample control circuitry. The signal Vc1 opens/closes the switch 252. Signal Vc2 provides the sampling period for the S&H 253. The exact turn-off of the switch 252, controlled by sample signal Vc1, and sampling window provided by sampling signal Vc2 depend on the particular design, and they may be equal. In some cases, sampling period is made as short as possible. The sampling period will depend on the application. It should be long enough to not unduly disturb the voltage V1 or the output power (no power will be delivered during the sampling window), but short enough that the output 263 of the S&H 253 remains at the correct value and that the output 263 can track changes in operating conditions (i.e., temperatures and load conditions) in a reasonable time. The output of the S&H 263 is coupled to a pulse width modulator (PWM) 254. PWM's are well-known in the industry and many complete PWM ICs are available, for example, the MC24060A from ON Semiconductor. The PWM provides the switching control signal 261 to the voltage converter 120. The switching control signal 261 has a duty cycle that is a function of the S&H output 263, and is related to the desired predetermined output power, e.g., Voc/2, or other predetermined output power. The switching control signal 261 drives the switching voltage converter 120 to maintain the voltage that corresponds to the desired predetermined output power at the output of the TEG 110.

Traditionally in switching converter circuits, the inputs to the PWM are the output voltage of a switching converter and a reference voltage. The output of the PWM is a periodic pulse signal that is connected to a switching transistor in the converter. Switching converters have the property that the ratio of their output and input voltages is a function of the duty cycle of the pulses applied to this transistor. The PWM uses negative feedback to control this duty cycle such that the output voltage of the converter tracks the reference voltage.

According to embodiments presented in this disclosure, the output of the S&H 253 and the TEG 110 output voltage, V1, are used as inputs to a pulse width modulator (PWM). This differs from typical use described in the preceding paragraph in that the output 263 of the S&H 253 and V1 are input voltages to the converter, not output voltages. As the converter duty cycle regulates the input-output voltage ratio, not the absolute voltage, the input voltage can be regulated just as well as the output voltage. In the embodiments discussed herein, the S&H output voltage 263 serves as the reference voltage and the input voltage V1 is compared to the S&H output voltage 263 in the PWM. As previously mentioned, the implementations described in various embodiments use a feedback loop wherein the inputs to the PWM are reversed from the traditional use.

For a given input, voltage, duty cycle, and load, the output voltage is specified. The designs discussed herein are substantially load agnostic, meaning that the performance does not substantially vary with the value of $Z_L$, although loads with negative resistance characteristics should be avoided to maintain positive feedback.

Figure 3:
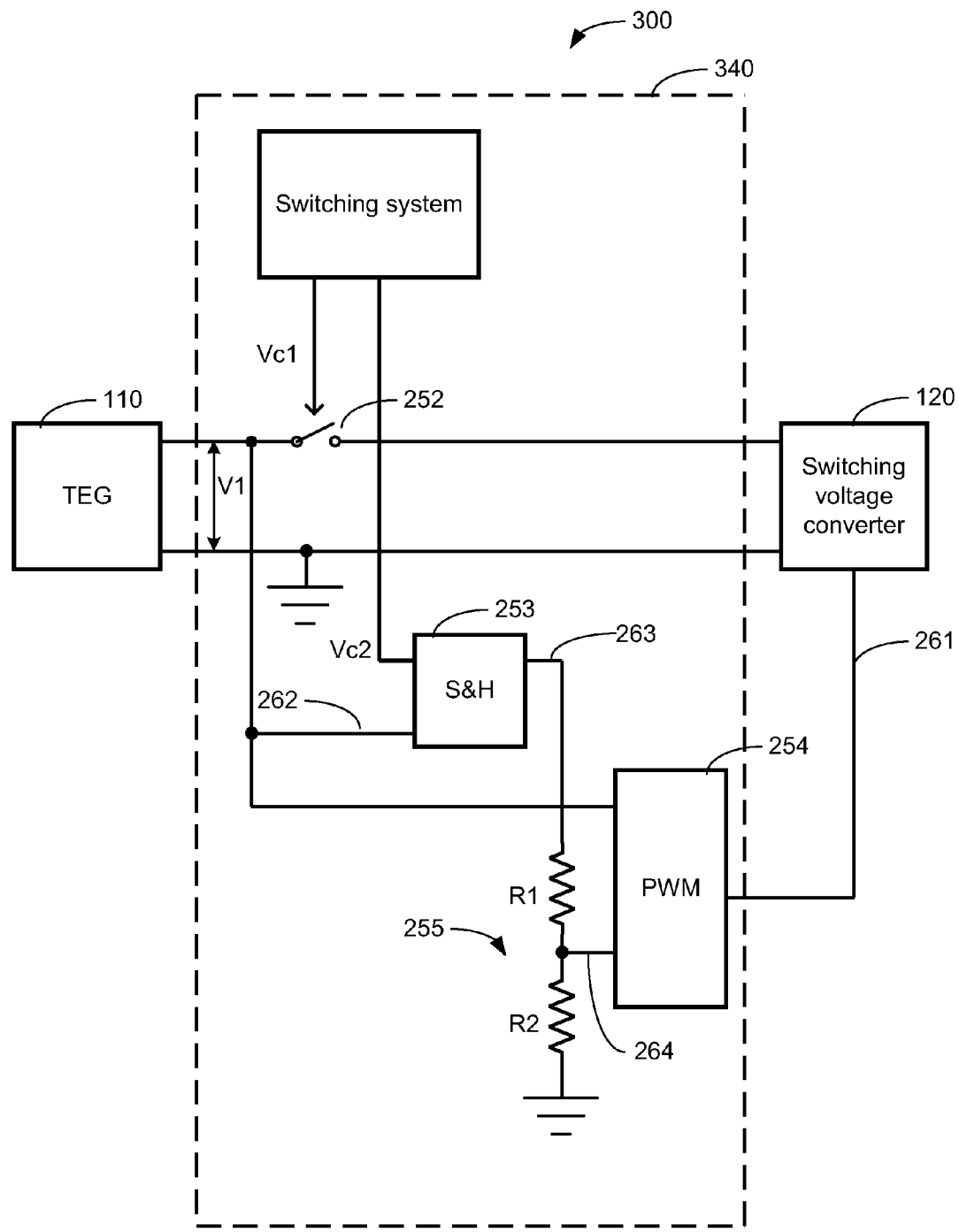
FIG. 3 illustrates a system wherein Voc is sampled and the output of the sample and hold circuitry is voltage divided to achieve the switching control signal for the pulse width modulator.

FIG. 3 shows another example of a TEG system 300 which is similar in some respects to TEG system 200 of FIG. 2 and comparable components are labeled with the same reference numbers. In the system 300 of FIG. 3, the S&H 253 is coupled directly to V1, so that during the sampling periods, the S&H 253 samples Voc rather than a fraction of Voc as in the system 200 in FIG. 2. In system 300, the output 263 of the S&H 253 is coupled to the voltage divider 255, so that the sample of Voc that is present at the output 263 of the S&H 253 is divided by the voltage divider 255 to provide the fraction of Voc to the reference input 264 of the PWM 254.

Figure 4:
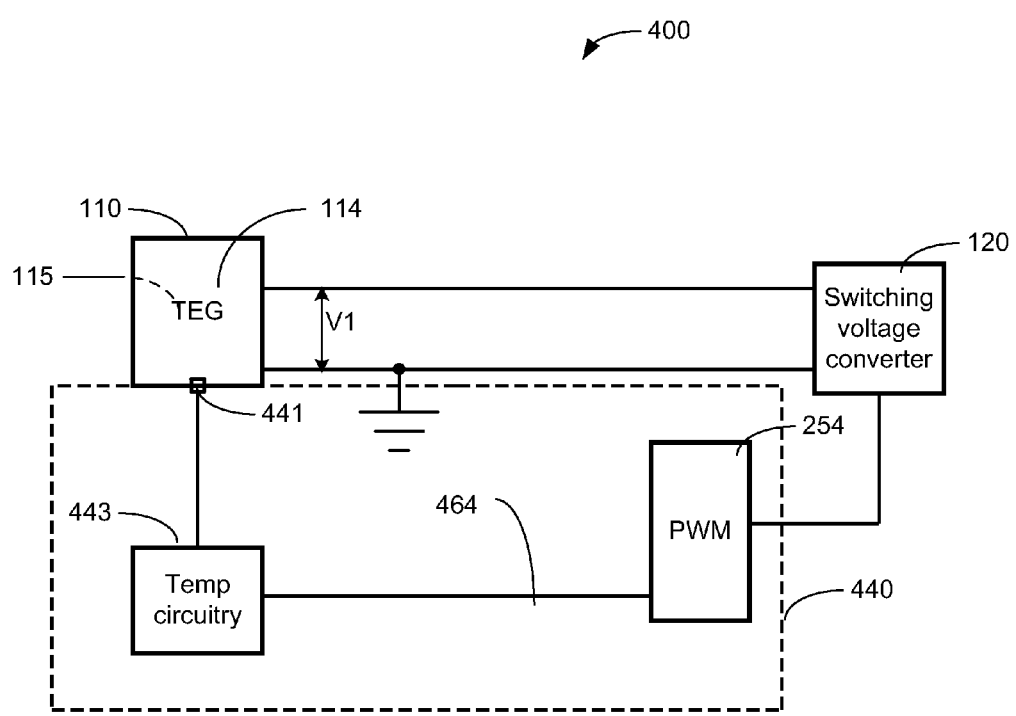
FIG. 4 is a block diagram illustrating temperature sensing to provide the output power control signal that corresponds to the fraction of Voc.

In some embodiments, the reference voltage of the PWM is developed from the temperature difference between the hot and cold portions 114, 115 of the TEG. These embodiments may not include the sampling circuitry depicted in systems 200, 300 of FIGS. 2 and 3. As previously discussed, the Voc of the TEG is related to the temperature differential AT by the Seebeck coefficient, α. A TEG system 400 that senses the temperature of the hot and cold sides 114, 115 of the TEG 110 and develops the PWM reference signal 464 from the temperature differential between the hot and cold sides 114, 115 of the TEG 110 is shown in FIG. 4. The control potion 440 of system 400 includes one or more temperature sensors 441 and associated temperature circuitry 443. For example, the temperature sensors 441 may include a first temperature sensor that senses the temperature of the hot side 114 of the TEG 110 and a second temperature sensor that senses the temperature of the cold side 115 of the TEG 110. The temperature sensors 441 may be thermocouples, resistance temperature detectors (RTDs), and/or other types of temperature sensing devices. The temperature circuitry 443 may include, for example components used to condition the temperature sensor outputs, to take the difference between the temperature sensor outputs, and/or to provide calibration and/or linearization of the outputs. In this example, the output from the temperature circuitry 443 is used as the reference signal 464 for the PWM 254. In some cases, the temperature sensors 441, e.g., RTDs, may be sufficiently linear with temperature so that linearization of the temperature sensor outputs is not needed. However, in some cases, such as when thermocouples are used as temperature sensors, the temperature sensor outputs are nonlinear with temperature and some linearization of the temperature sensor outputs by the temperature circuitry 443 is desirable. In these cases, linearization and/or calibration of the temperature sensor outputs may be accomplished using analog and/or digital signal processing approaches.

Figure 5:
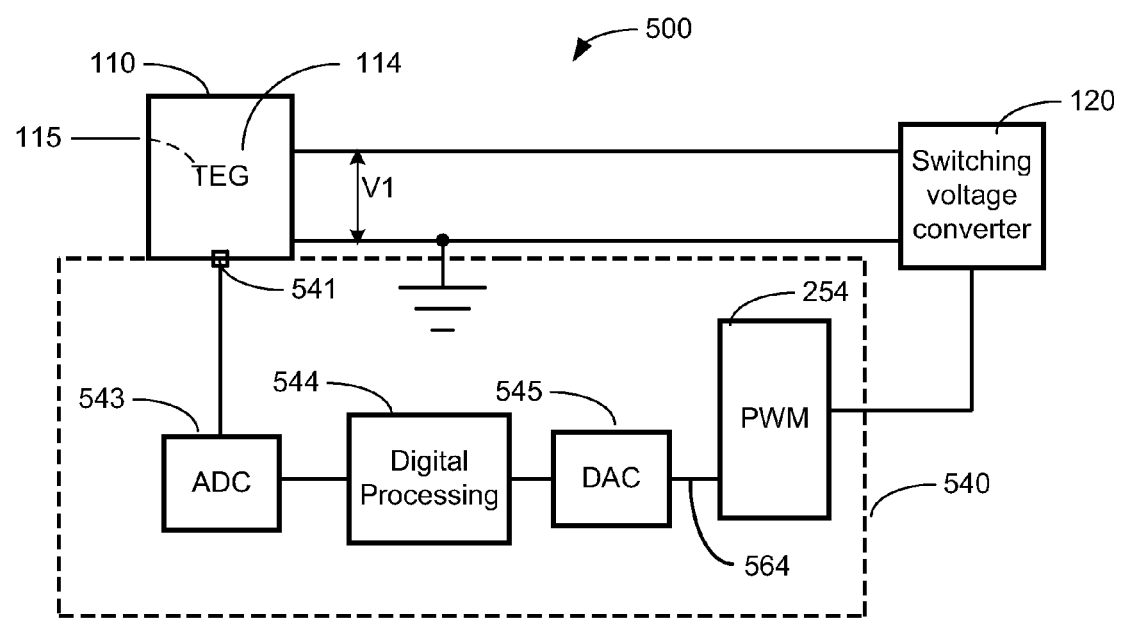
FIG. 5 shows an implementation that uses digital signal processing to linearize and/or calibrate the temperature sensor output.

FIG. 5 shows one approach for a TEG system 500 in which the calibration and/or linearization of the temperature sensor outputs is accomplished using digital processing circuitry. One or more analog outputs from the temperature sensors 541 are converted from analog to digital form using an analog-to-digital converter (ADC) 543. The one or more temperature sensor outputs may comprise the analog outputs of both temperature sensors and/or the difference signal between the temperature sensor outputs. The digital signal is then processed by digital processing circuitry 544. The digital processing circuitry 544 may provide linearization and/or calibration for the temperature sensor outputs, for example. The linearized and/or calibrated digital signal may then be converted back from a digital signal to an analog signal using the digital-to-analog converter 545. The linearized and/or calibrated analog signal provides the reference input 564 for the PWM 254.

Figure 6:
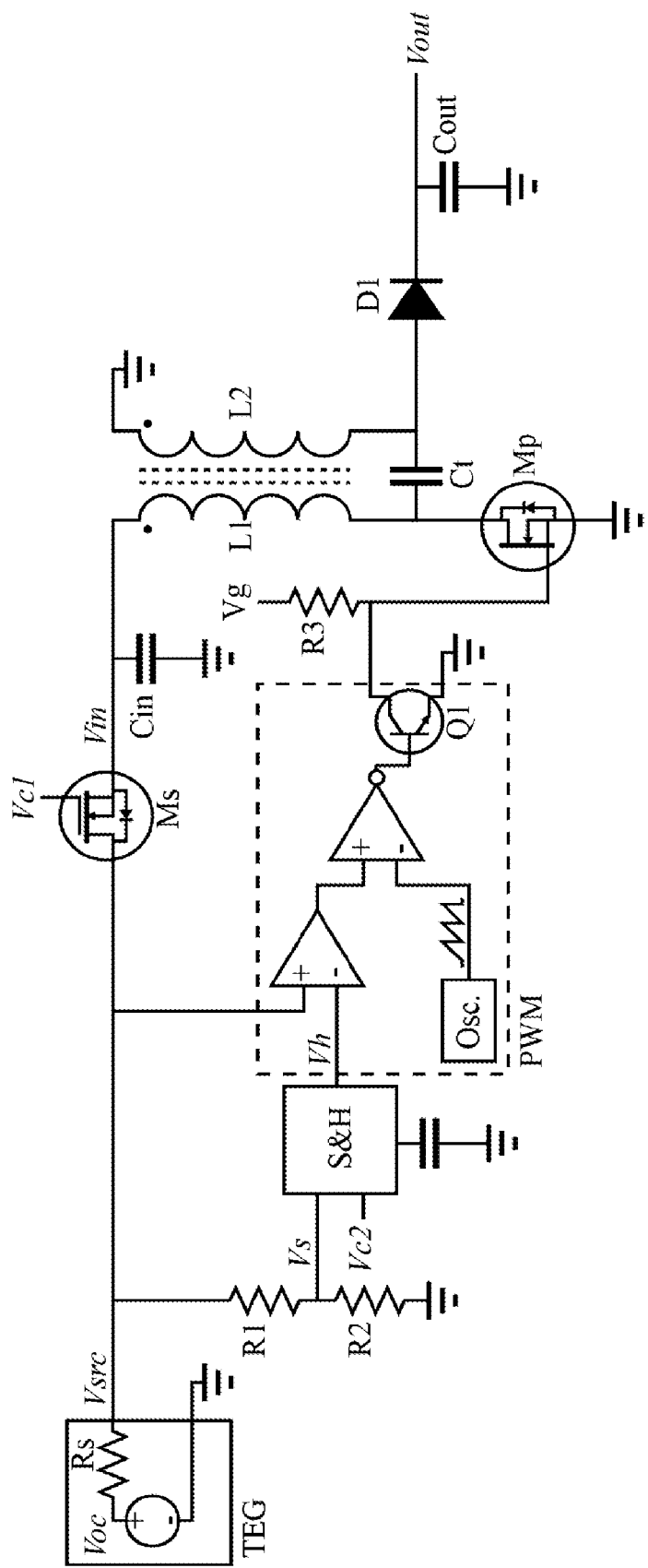
FIG. 6 is a schematic of an experimental TEG system.

Another embodiment of a TEG output power tracking system 600 is shown in FIG. 6. In this implementation, the output of the TEG is connected through a metal oxide semiconductor field effect transistor (MOSFET) Ms to the input of a SEPIC converter consisting of input capacitor Cin, output capacitor Cout, coupled inductors L1 and L2, SEPIC capacitor Ct, power MOSFET Mp, and diode D1. It is also connected through a voltage divider made up of resistors R1 and R2 to the input of a sample & hold circuit. A low value at control signal Vs1 opens Ms, disconnecting the TEG from the converter. After a long enough interval such that Vsrc settles to Voc, Vs is sampled with signal Vc2 and held on node Vh. R1 and R2 are designed to have the same relatively large value, such that their power dissipation is low and the divided voltage input Vs is equal to Voc/2 at the time of sampling. After sampling, Ms is closed, reconnecting Vsrc to the input of the SEPIC converter.

The PWM generator (the inside of the dashed box in FIG. 6) compares the sampled value Vh with Vsrc and modulates the converter via the output driver Q1 and R3. Voltage Vg is set to the on-voltage of Mp. The ratio of the input to output voltages in an ideal SEPIC converter is given by Vin/Vout=(1−D)/D, where D is the duty cycle of Mp. If Vsrc is greater than Vh, D increases, bringing Vsrc down. Note that this negative feedback loop is independent of Vout, which can be held constant, such as for battery charging, or allowed to vary, such as with a resistive load.

As the converter is idle while Ms is open, frequent sampling reduces the power output of the device. On the other hand, the response time of the converter to varying temperature or load is limited by the sampling period. These considerations determine the optimal sampling frequency which depend on the application.

The TEG system 600 shown in FIG. 6 was implemented using the components described in Table 1.

TABLE 1

| DESIGN DETAILS | | | |
|---|---|---|---|
| R1, R2 | 1 MΩ | TEG | Tellurex G1-40-0322 |
| Cin | 47 μF | S&H | National LF398 |
| Ct | 330 μF | PWM | ON Semi. MC33060A |
| Cout | 470 μF | Mp, Ms | Fairchild FDN339AN |
| L1, L2 | 68 μH (coupled) | D1 | NXP PMEG3050EP |
| R3 | 68 Ω | | |

Figure 7:
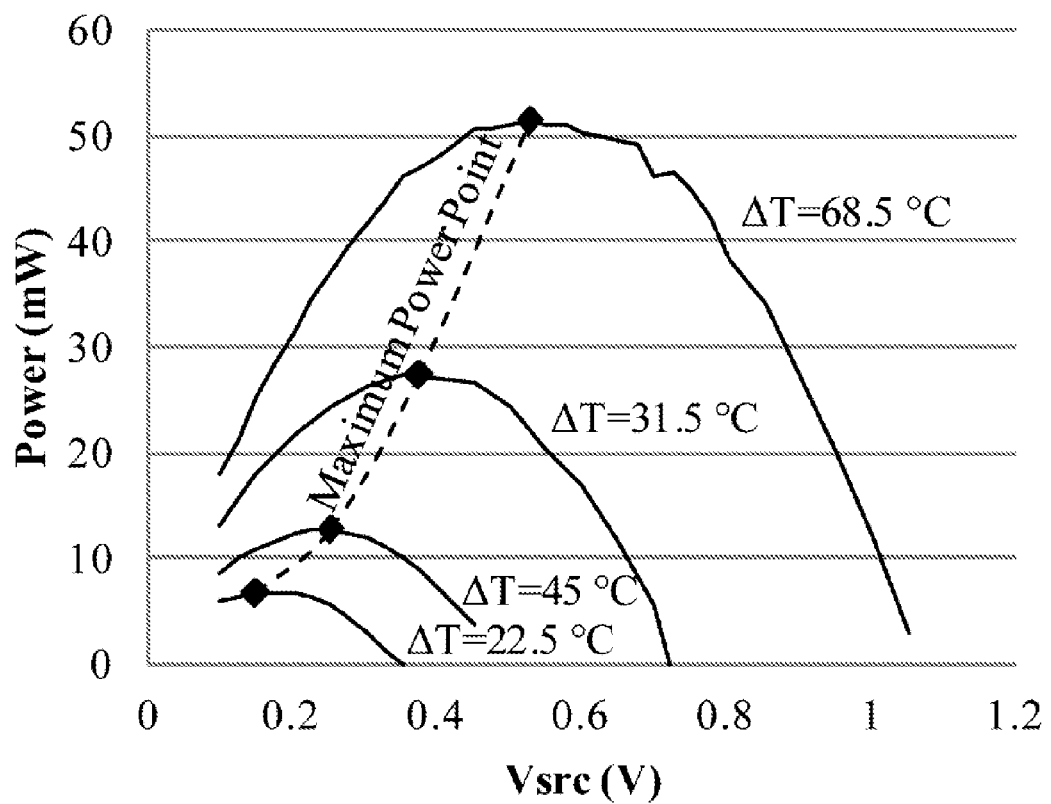
FIG. 7 shows the measured output power of the experimental TEG system of FIG. 6 at different temperatures.

The TEG was specified for a maximum output voltage of 2.8 V and maximum power of 2.3 W, and nominal output resistance of 3.4 Ω. Thermocouples were affixed to the center of either side of the TEG with thermally conductive epoxy. Heat was supplied with a resistive heater and removed with a heat sink and fan. FIG. 7 shows the measured output power of the TEG at different temperatures. It can be seen that the power follows the expected parabolic curve and that the voltage corresponding to the maximum output power varies with temperature.

Figure 8:
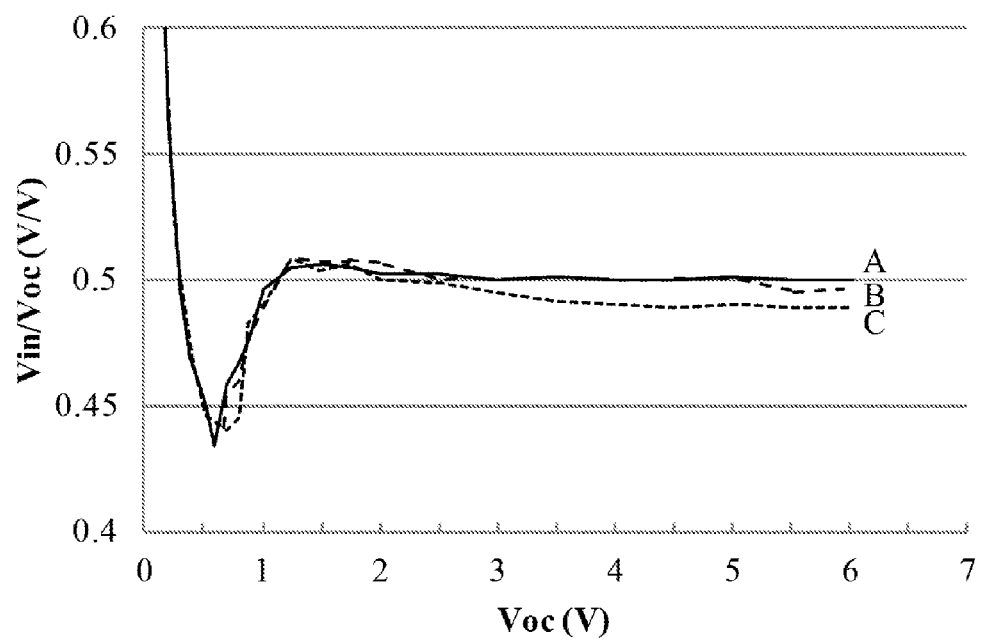
FIG. 8 shows the ratio of Vin/Voc as a function of Voc with a source resistance of 5.4 Ω and three load conditions for the experimental circuit of FIG. 6.
Figure 9:
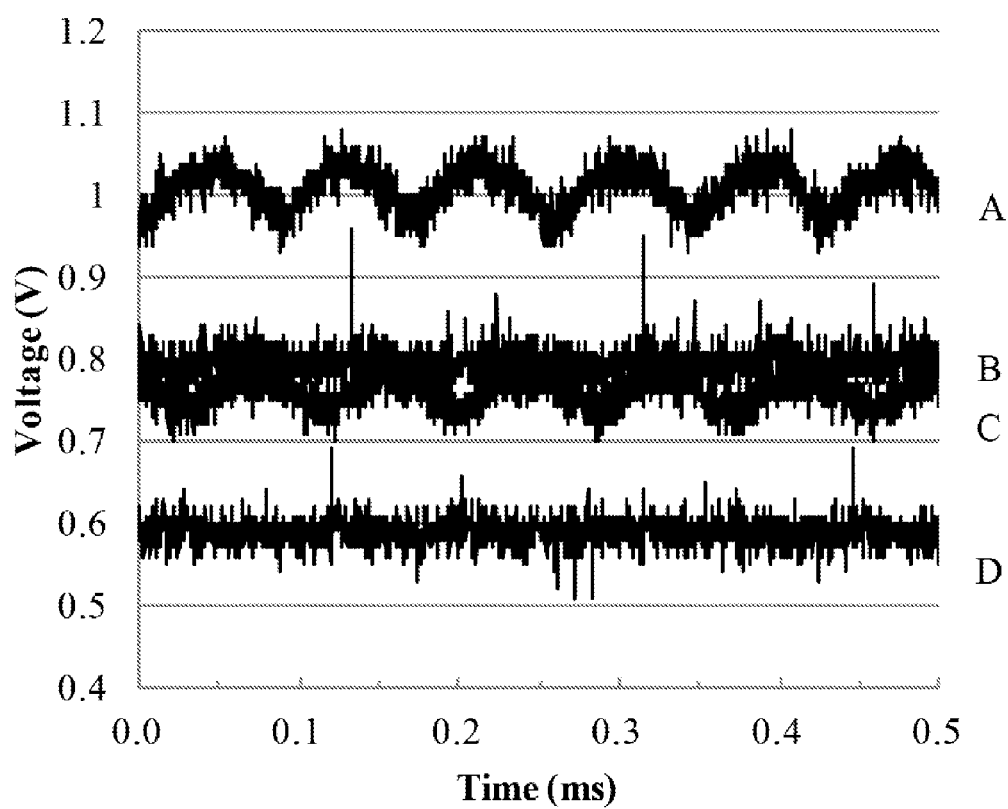
FIG. 9 shows the measured input and output voltage characteristics with a source resistance of 20 Ω and load resistance of 20.6 Ω for the experimental circuit of FIG. 6.

The SEPIC converter was operated at a switching frequency of 94 kHz with a Voc sampling frequency of 2.5 Hz. The sampling signal Vc2 is a 50 μs pulse centered in a 100 μs window during which Vc1 is low. Before connecting the converter to the TEG, the behavior of the converter control loop was verified using an emulated TEG consisting of a constant voltage source with a fixed source resistance. Both constant resistance and constant voltage loads were tested. FIG. 8 shows that for both types of loads, depending on operating conditions, Vsrc can be maintained within about 5% or even within about 1% of Voc/2 except at low Voc. FIG. 8 shows the ratio of Vin/Voc as a function of Voc with a source resistance of 5.4 Ω and three load conditions: Graph (A) shows the results for a constant resistance of 20 Ω, graph (B) shows the results for a constant voltage of 2 V, and graph (C) shows the results for a constant voltage of 0.5 V. FIG. 9 shows the measured input and output voltage characteristics with a source resistance of 20 Ω and load resistance of 20.6 Ω: Graph (A) shows Vin for Voc of 2 V, Graph (B) shows Vout for Voc of 2 V, Graph (C) shows Vin for Voc of 1.5 V, and Graph (D) shows Vout for Voc of 1.5 V.

The maximum measured efficiency of the SEPIC converter is about 69%. Higher efficiencies could be achieved by replacing the diode with a synchronous MOSFET. With the low output voltages in this demonstration, the diode voltage drop significantly impacts the efficiency. Alternatively, if the specifications of the application allow, a more efficient topology such as buck or boost can be used.

Figure 10:
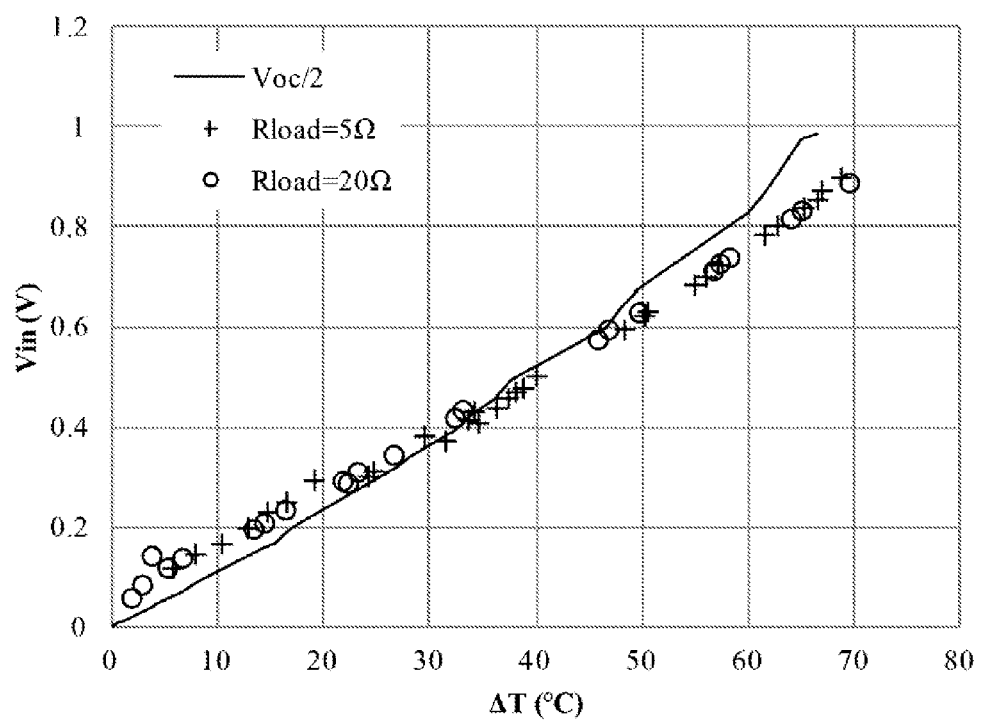
FIG. 10 shows the working input voltage of the converter of FIG. 6 compared to the measured open circuit voltage of the TEG output as a function of input temperature differential for both 5 Ω and 20 Ω resistive loads.

After the control functionality was confirmed, the complete system was tested by connecting the output of the TEG to the input of the converter. FIG. 10 shows the working input voltage of the converter of FIG. 6 compared to the measured open circuit voltage of the TEG output as a function of input temperature differential for both 5 Ω and 20 Ω resistive loads. The converter performance is nearly independent of the load and approximately follows the Voc/2 curve, falling off slightly for higher temperature differentials.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A device, comprising:
a thermoelectric generator (TEG) configured to develop a voltage between an output terminal and a common terminal based on a temperature difference between hot and cold portions of the TEG;
a switching voltage converter having an input terminal, a common terminal, and a switching control terminal, the output terminal of the TEG coupled to the input terminal of the switching voltage converter; and
control circuitry including:
a pulse width modulator (PWM) having at least one PWM output terminal coupled to the switching control terminal of the switching voltage converter, the PWM configured to generate pulses at the PWM output terminal, the pulses having a duty cycle that is variable based on a difference between a loaded output voltage of the TEG and a predetermined fraction of an unloaded open circuit voltage of the TEG, Voc, the duty cycle of the pulses configured to maintain the loaded voltage at the output terminal of the TEG to within a tolerance range of the fraction of Voc;
sample and hold circuitry;
a voltage divider having an input terminal and an output terminal, the input terminal of the voltage divider coupled to the output terminal of the TEG; and
sampling circuitry configured to periodically electrically decouple the output terminal of the TEG from the switching voltage converter so that Voc is present at the output of the TEG and the fraction of Voc is present at the output terminal of the voltage divider, the sampling circuitry further configured to cause the sample and hold circuitry to sample the fraction of Voc.

2. The device of claim 1, wherein the fraction of the Voc is Voc/2.

3. The device of claim 1, wherein the control circuitry comprises a temperature sensor circuitry configured to measure temperatures of the hot and cold portions of the TEG, and to output a signal that is proportional to the fraction of Voc and which is used to control the duty cycle.

4. The device of claim 3, wherein the temperature sensor circuitry comprises a temperature sensor having one or more outputs that are substantially linear with temperature over a working temperature range of the TEG.

5. The device of claim 1, wherein the control circuitry comprises:
a temperature sensor configured to sense temperatures of the hot and cold portions of the TEG and to provide at least one temperature signal that is based on the sensed temperatures, the at least one temperature signal having a non-linear characteristic with respect to temperature; and
a temperature calibration component configured to substantially linearize the temperature signal and to provide a calibrated signal based on the temperature difference between the hot and cold portions of the TEG, the calibrated signal being proportional to Voc and used to control the duty cycle.

6. The device of claim 5, wherein the temperature calibration component comprises:
an analog to digital converter configured to convert the temperature signal from an analog temperature signal to a digital temperature signal;
digital processing circuitry configured to convert the digital temperature signal to a linearized digital temperature signal that varies substantially linearly with the temperature difference between the hot and cold sides of the TEG; and
a digital to analog converter configured to convert the linearized digital output signal to an analog output signal that is proportional to the fraction of Voc.

7. The device of claim 6, wherein the digital processing circuitry is configured implement program instructions to access calibration values stored in a lookup table to convert the digital temperature signal to the linearized digital temperature signal.

8. The device of claim 1, wherein the switching voltage converter is one or more of a buck converter, a boost converter, a single-ended primary inductor converter (SEPIC), a buck-boost converter, a Cuk converter, a zeta converter, a non-isolated switching converter, a forward converter, a flyback converter, an isolated switching converter, and derivatives thereof.

9. The device of claim 1, wherein the switching voltage converter comprises a synchronous voltage converter.

10. The device of claim 1, wherein the TEG comprises multiple discreet TEG units connected in one or both of parallel and series.

11. The device of claim 1, wherein the tolerance range is about 5%.

12. The device of claim 1, wherein the tolerance range is about 1%.

13. A device, comprising:
a thermoelectric generator (TEG) having an output terminal;
a switching voltage converter having an input terminal and a switching control terminal, the output terminal of the TEG coupled to the input terminal of the switching voltage converter;
sample and hold circuitry;
a voltage divider having an input terminal and an output terminal, the input terminal of the voltage divider coupled to the output terminal of the TEG;
sampling circuitry configured to periodically electrically decouple the output terminal of the TEG from the switching voltage converter so that an unloaded open circuit voltage, Voc, of the TEG is present at the output of the TAG and the fraction Voc is present at the output terminal of the voltage divider, the sampling circuitry further configured to cause the sample and hold circuitry to sample the fraction of Voc; and
a pulse width modulator (PWM) having at least one PWM output terminal coupled to the switching control terminal of the switching voltage converter, the PWM configured to generate pulses at the PWM output terminal, the pulses having a duty cycle based on a difference between a loaded voltage of the TEG and the fraction of Voc, the duty cycle of the pulses configured to maintain the loaded voltage at the output of the TEG to within a tolerance range of the fraction of Voc.

14. The device of claim 13, wherein the fraction of the Voc is Voc/2.

15. The device of claim 13, wherein the voltage converter is one or more of a buck converter, a boost converter, a single-ended primary inductor converter (SEPIC), a buck-boost converter, a Ćuk converter, a zeta converter, a non-isolated switching converter, a forward converter, a flyback converter, an isolated switching converter, and derivatives thereof.

16. The device of claim 13, wherein the switching voltage converter comprises a synchronous voltage converter.

17. The device of claim 13, wherein the TEG comprises multiple discreet TEG units connected in one or both of parallel and series.

18. The device of claim 13, wherein the tolerance range is less than about 5%.

19. A method, comprising:
 generating electrical energy based on a temperature difference using a thermoelectric generator (TEG);
 converting a first voltage at an output terminal of the thermoelectric generator to a second voltage using a switching voltage converter;
 controlling the switching voltage converter using pulses having a duty cycle that is based on a difference between a loaded output voltage at the output of the TEG and a fraction of an unloaded, open circuit voltage, Voc, of the TEG, the controlling comprising;
  using a voltage divider to provide a fraction of Voc, the voltage divider having an input terminal and an output terminal, the input terminal of the voltage divider coupled to an output terminal of the TEG; and
  periodically electrically decoupling the output terminal of the TEG from the switching voltage converter so that Voc is present at the output of the TEG and the fraction of Voc is present at the output terminal of the voltage divider; and
  sampling the fraction of Voc during a time that the output terminal of the TEG is electrically decoupled from the switching voltage converter; and
 maintaining a loaded voltage at the output terminal of the TEG to within a tolerance range of the fraction of Voc.

20. The method of claim 19, wherein the fraction of the Voc is Voc/2.

21. The method of claim 19, comprising:
 sensing temperatures at the hot and cold sides of the TEG; and
 determining the fraction of Voc based on the sensed temperatures.

* * * * *